United States Patent
Mooney et al.

(10) Patent No.: US 9,323,358 B2
(45) Date of Patent: Apr. 26, 2016

(54) CORRECTING LOCATION ERRORS IN TACTILE INPUT DEVICE

(71) Applicant: GOOGLE INC., Mountain View, CA (US)

(72) Inventors: Charles Mooney, San Francisco, CA (US); Andrew de los Reyes, Belmont, CA (US)

(73) Assignee: Google Inc., Mountain View, CA (US)

(*) Notice: Subject to any disclaimer, the term of this patent is extended or adjusted under 35 U.S.C. 154(b) by 165 days.

(21) Appl. No.: 13/873,727

(22) Filed: Apr. 30, 2013

(65) Prior Publication Data
US 2015/0254946 A1    Sep. 10, 2015

(51) Int. Cl.
*G06F 3/0354*    (2013.01)

(52) U.S. Cl.
CPC .................. *G06F 3/03547* (2013.01)

(58) Field of Classification Search
CPC ...................................................... G06F 3/0418
USPC .......................................................... 345/173
See application file for complete search history.

(56) References Cited

U.S. PATENT DOCUMENTS

| | | | |
|---|---|---|---|
| 7,646,380 B2 | 1/2010 | Tsang | |
| 8,164,582 B2 | 4/2012 | North et al. | |
| 8,345,022 B2 | 1/2013 | Shen | |
| 8,427,451 B2* | 4/2013 | Waterbury | 345/174 |
| 2006/0092139 A1* | 5/2006 | Sharma | 345/173 |
| 2009/0025987 A1* | 1/2009 | Perski | G06F 3/041 |
| | | | 178/18.03 |
| 2012/0131515 A1 | 5/2012 | Rice | |
| 2012/0206380 A1* | 8/2012 | Zhao et al. | 345/173 |
| 2012/0280946 A1* | 11/2012 | Shih | G06F 3/045 |
| | | | 345/178 |

* cited by examiner

*Primary Examiner* — Ariel Balaoing
(74) *Attorney, Agent, or Firm* — Brake Hughes Bellermann LLP

(57) ABSTRACT

A method may include measuring multiple location readings across a tactile input device at multiple times. The method may also include determining predicted location values corresponding to multiple locations across the tactile input device at the multiple measured times. The method may also include storing a table mapping the multiple location readings to the predicted location values.

17 Claims, 11 Drawing Sheets

Measurements 500

Table 222

| X(measured) | Y(measured) | Pressure | X(Predicted) | Y(Predicted) |
|---|---|---|---|---|
| 0 | 0 | 1 | 0 | 0 |
| 0.3 | 0.5 | 1 | 1 | 1 |
| 2.6 | 2.5 | 1 | 2 | 2 |
| 3.2 | 3.0 | 1 | 3 | 3 |
| 3.3 | 3.3 | 1 | 4 | 4 |
| 5.4 | 5.6 | 1 | 5 | 5 |
| 5.9 | 6.1 | 1 | 6 | 6 |
| 6.5 | 6.9 | 1 | 7 | 7 |
| 8.6 | 8.4 | 1 | 8 | 8 |
| 9.1 | 8.9 | 1 | 9 | 9 |
| 0.4 | 0.2 | 2 | 0 | 0 |
| 0.6 | 0.8 | 2 | 1 | 1 |
| 2.1 | 2.1 | 2 | 2 | 2 |
| 2.9 | 2.9 | 2 | 3 | 3 |
| 3.7 | 3.7 | 2 | 4 | 4 |
| 5.2 | 5.4 | 2 | 5 | 5 |
| 5.7 | 6.0 | 2 | 6 | 6 |
| 6.6 | 6.8 | 2 | 7 | 7 |
| 8.3 | 8.1 | 2 | 8 | 8 |
| 8.9 | 9.1 | 2 | 9 | 9 |

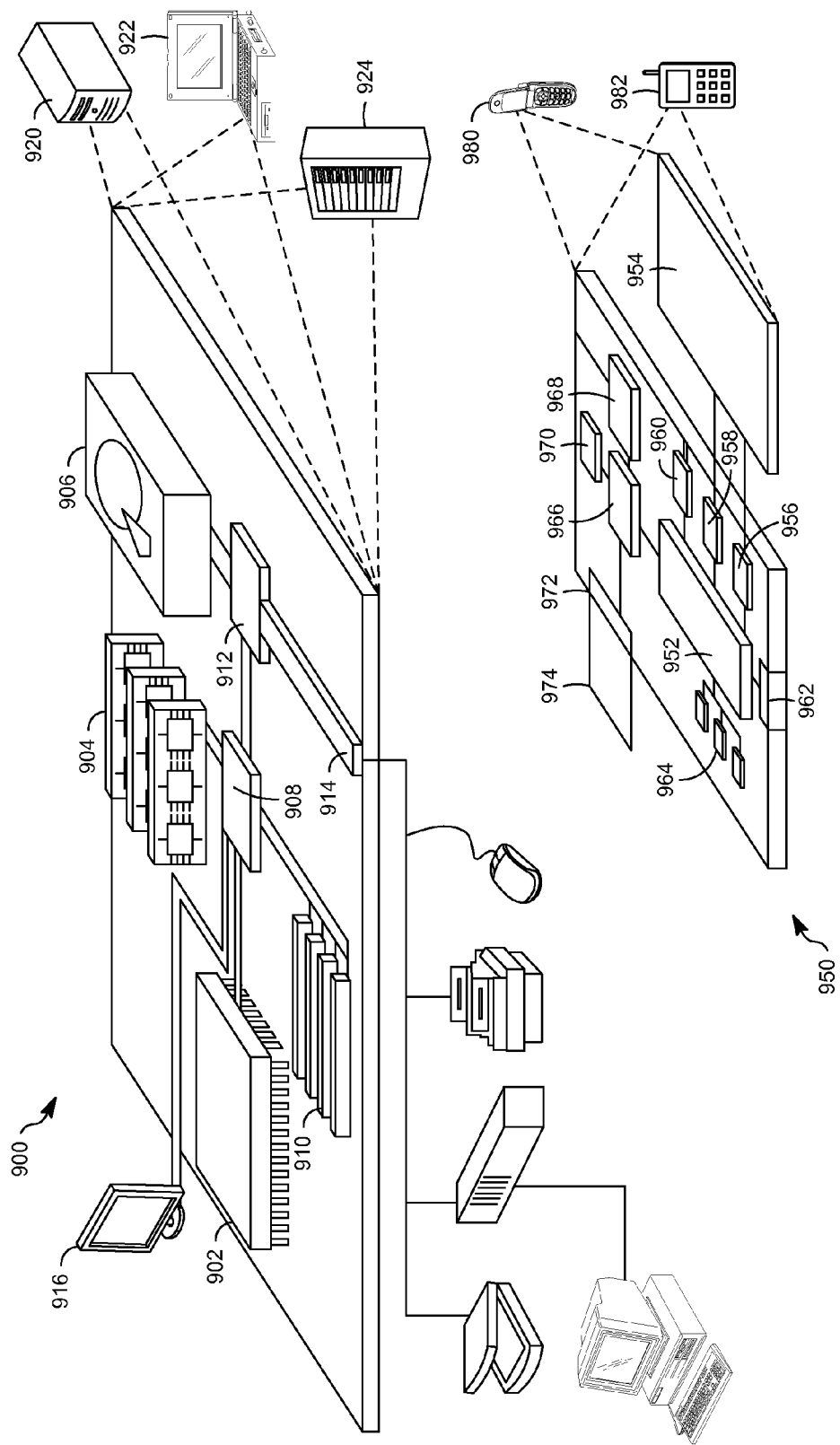

CORRECTING LOCATION ERRORS IN TACTILE INPUT DEVICE

TECHNICAL FIELD

This description relates to tactile input devices.

BACKGROUND

Tactile input devices, such as trackpads, touchpads, or touchscreens, may allow a user to provide input to a computing device using pressure, such as placing or sliding a finger on the tactile input device. Tactile input devices may include sensor grids that determine the location of contact with respect to the grid. When the location of the contact is between gridlines, the tactile input device may inaccurately determine the location of the contact.

SUMMARY

In an example implementation, a stylus may be slid across a tactile input device, such as a trackpad, touchpad, or touchscreen, across multiple locations of the tactile input device. A table may be generated with location measurements, pressure measurements, and actual locations of the stylus based on the sliding the stylus across the tactile input device. The tactile input device may later use the table to determine actual locations of a stylus or finger based on received measurements or readings.

According to one general aspect, a method may include measuring multiple location readings across a tactile input device at multiple times. The method may also include determining predicted location values corresponding to multiple locations across the tactile input device at the multiple measured times. The method may also include storing a table mapping the multiple location readings to the predicted location values.

According to another general aspect, a non-transitory computer-readable storage medium may comprise instructions stored thereon. When executed by at least one processor, the instructions may be configured to cause a computing system to at least receive at least one measured location reading, the at least one measured location reading indicating at least one location on a tactile input device, map the at least one measured location reading to at least one predicted location, and pass the at least one predicted location to an application.

According to another general aspect, a non-transitory computer-readable storage medium may comprise instructions stored thereon. When executed by at least one processor, the instructions may be configured to cause a computing system to at least measure multiple location readings across a tactile input device at multiple times, determine predicted location values corresponding to locations across the tactile input device at the multiple measured times, and store a table mapping the multiple location readings to the predicted location values.

According to one general aspect, a device may include means for measuring multiple location readings across a tactile input device at multiple times. The device may also include means for determining predicted location values corresponding to multiple locations across the tactile input device at the multiple measured times. The device may also include means for storing a table mapping the multiple location readings to the predicted location values.

According to another general aspect, an article of manufacture may comprise means for storing instructions. When executed by at least one processor, the instructions may include means for causing a computing system to at least receive at least one measured location reading, the at least one measured location reading indicating at least one location on a tactile input device, map the at least one measured location reading to at least one predicted location, and pass the at least one predicted location to an application.

According to another general aspect, an article of manufacture may comprise means for storing instructions. When executed by at least one processor, the instructions may include means for causing a computing system to at least measure multiple location readings across a tactile input device at multiple times, determine predicted location values corresponding to locations across the tactile input device at the multiple measured times, and store a table mapping the multiple location readings to the predicted location values.

The details of one or more implementations are set forth in the accompanying drawings and the description below. Other features will be apparent from the description and drawings, and from the claims.

BRIEF DESCRIPTION OF THE DRAWINGS

FIG. 9 shows an example of a computer device and a mobile computer device that can be used to implement the techniques described here.

DETAILED DESCRIPTION

A tactile input device for use with a computing device can be used to communicate with and control operations of the computing device. The tactile input device can be configured to be contacted by a user on a top surface of the tactile input device to trigger an electronic signal within the computing device. For example, a user can slide or move one or more fingers, or, in some cases, knuckles or a portion of a hand, across the top surface of the tactile input device to move a cursor visible on a display of the computing device. The tactile input device, while generally accurate, may at times generate inaccurate readings in the location of the user's finger along the top surface. In an example in which the tactile input device includes sensor grid lines, the tactile input device may approximate the location of the user's finger as being closer to a grid line, or farther away from a grid line, than the user's finger actually is. The inaccuracy may be different in different parts of the tactile input device; for known or unknown reasons, one portion of the tactile input device may render accurate location measurements, whereas another portion may render inaccurate location measurements. Processes and functions described herein may correct these inaccuracies by placing a stylus or other object on various locations on the tactile input device, mapping various measured locations of the stylus or other object on the tactile input device to the actual various locations of the stylus or other object on the tactile input device, and storing the mapping. The trackpad or other component of the computing device may thereafter determine the actual locations of a stylus, user's finger, or other object by mapping measured or received locations to the stored mapping.

As used herein, a reference to a top view in a figure refers to a view as viewed by a user during use of an input device. For example, a top view can refer to a view of the tactile input device as disposed within a computing device such that the user can contact the top surface of the tactile input device to initiate an action within the computing device.

Figure 1A:
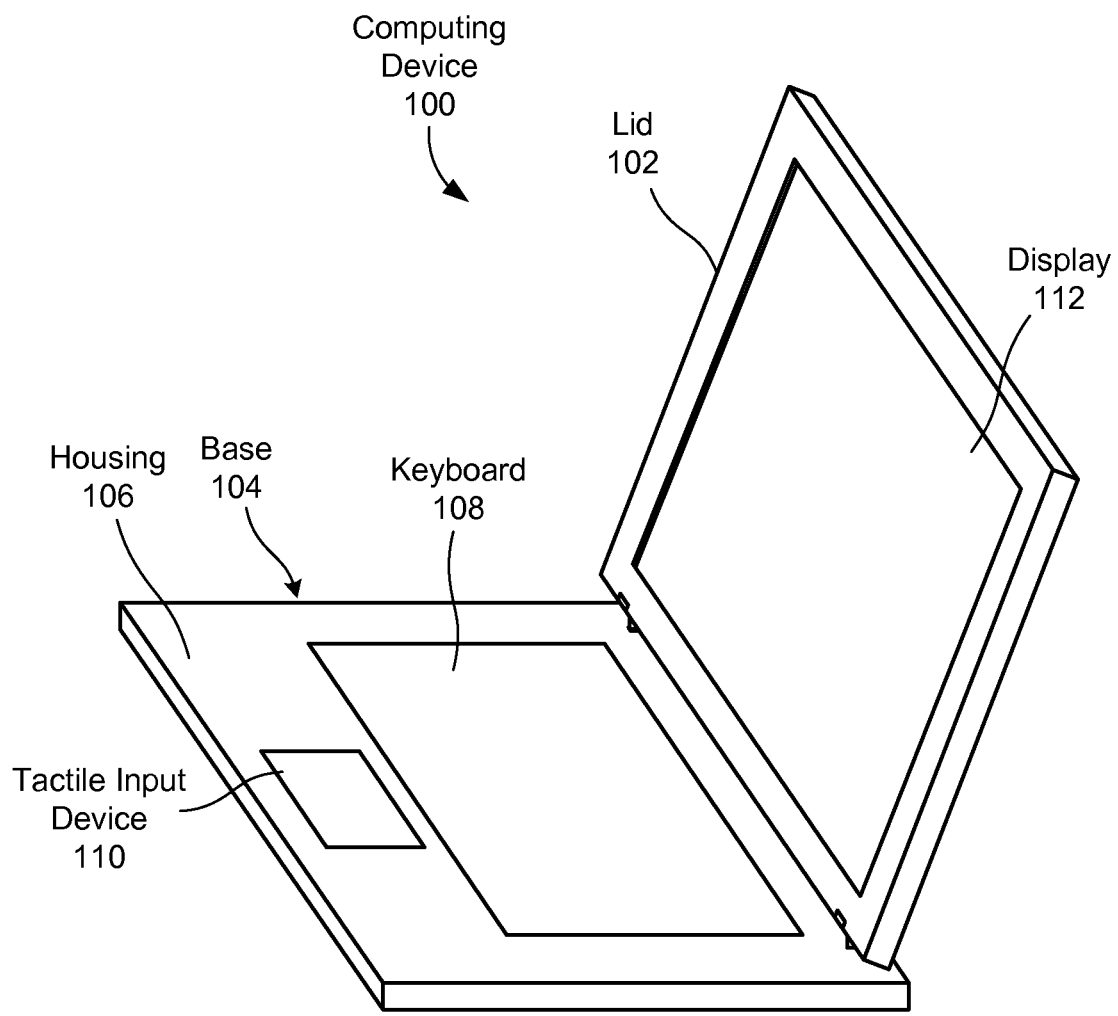
FIG. 1A is a diagram of a computing device including a tactile input device, according to an example implementation.

FIG. 1A is a diagram of a computing device 100 including a tactile input device, according to an example implementation. The computing device 100 may include a laptop or notebook computer with the tactile input device 110 built into a base 104 of the computing device 100, may include a desktop computer with a tactile input device attached thereto, or any computing device in communication with a tactile input device. In the example show in FIG. 1A, the computing device 100 includes a lid 102 and a base 104. The lid 102 may include a display 112 that can be, for example, a liquid crystal display (LCD), a light emitting diode (LED) display, or other type of electronic visual display device. The base 104 can include, among other components, the tactile input device 110, a housing 106, and a keyboard 108.

The tactile input device 110 can include a sensor (shown in FIG. 1B), and a top surface (shown in FIG. 1B) configured to receive inputs (e.g., a touch, swipe, scroll, drag, click, hold, tap, combination of inputs, etc.) by a user. The sensor can be activated when a user enters an input on the top surface of the tactile input device 110, and can communicate electronic signals within the computing device 100. The sensor can be, for example, a flame-retardant class-4 (FR3) printed circuit board. Other components, such as a dome switch, adhesive sheets, and cables (not shown) may also be integrated in computing device 100 to process input by a user via tactile input device 110 or keyboard 108. Various elements shown in the display 112 of the computing device 100 may be updated based on various movements of contacts on the tactile input device 110 or keyboard 108. In an example implementation, such as when the display 112 is a touchscreen, the tactile input device may be included in the display 112.

Tactile input devices, such as tactile input device 110, may be used in self-contained portable laptop computers such as the computing device 100, and do not require a flat surface near the computer. The tactile input device 110 may be positioned close to the keyboard 108. Tactile input device functionality is also available for desktop computers in keyboards with built-in touchpads, and in mobile devices, as described in more detail below with respect to FIG. 9.

The components of the input devices (e.g., 108, 110) described here can be formed with a variety of different materials such as plastic, metal, glass, ceramic, etc. used for such components. For example, the cover member 118 and base member 104 can each be formed, at least in part, with an insulating material and/or conductive material such as a stainless steel material, for example, SUS301 or SUS304.

Figure 1B:
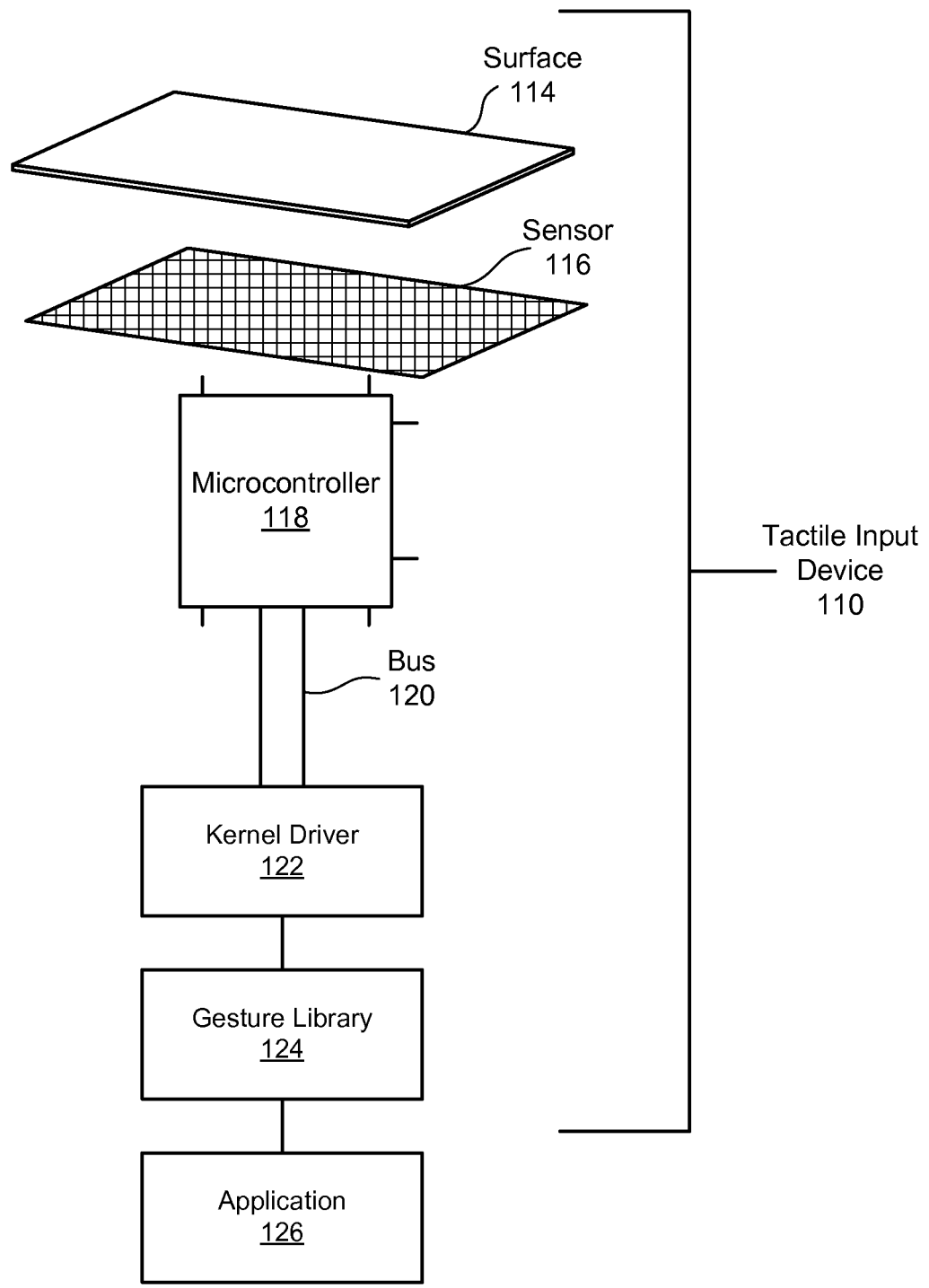
FIG. 1B is a diagram of the tactile input device and related components, according to an example implementation.

FIG. 1B is a diagram of the tactile input device 110 and related components, according to an example implementation. In this example, the tactile input device 110 includes surface 114, sensor 116, controller 118, bus 120, kernel driver 122, gesture library 124, and provide input to an application(s) 126.

The surface 114 may be configured to be contacted by a user to actuate and trigger an electrical response within the computing device 100. Surface 114 may be operably coupled to sensor 116. Sensor 116 can be activated when a user enters an input (e.g., a touch, swipe, or a click) on the top surface 114 of the tactile input device 110. The sensor 116 can be, for example, a flame-retardant class-4 (FR4) printed circuit board. Microcontroller 118 may be operably coupled to sensor 116. Microcontroller 118 may be an embedded microcontroller chip and may include, for example, read-only firmware. Microcontroller 118 may include a single integrated circuit containing a processor core, memory, and programmable input/output peripherals. Bus 120 may be a PS/2, I2C, SPI, WSB, or other bus. Bus 120 may be operably coupled to microcontroller 118 and may communicate with kernel driver 122. Kernel driver 122 may include firmware and may also include and/or communicate with gesture library 124.

Gesture library 124 may include executable code, data types, functions, and other files (such as JAVASCRIPT files) which may be used to process input to tactile input device 110 (such as multitouch gestures). Gesture library 124, in combination with kernel driver 122, bus 120, controller 118, sensor 116, and surface 114, may be used to implement various processes and functionalities described herein. The gesture library 124 may, for example, map received contact point readings to a table to determine predicted contact readings. The gesture library 124 may pass the predicted contact readings to one or more application(s) 126. The one or more application(s) 126 may include, for example, an operating system, a web browser, a word processing application, or a game, as non-limiting examples.

Figure 1C:
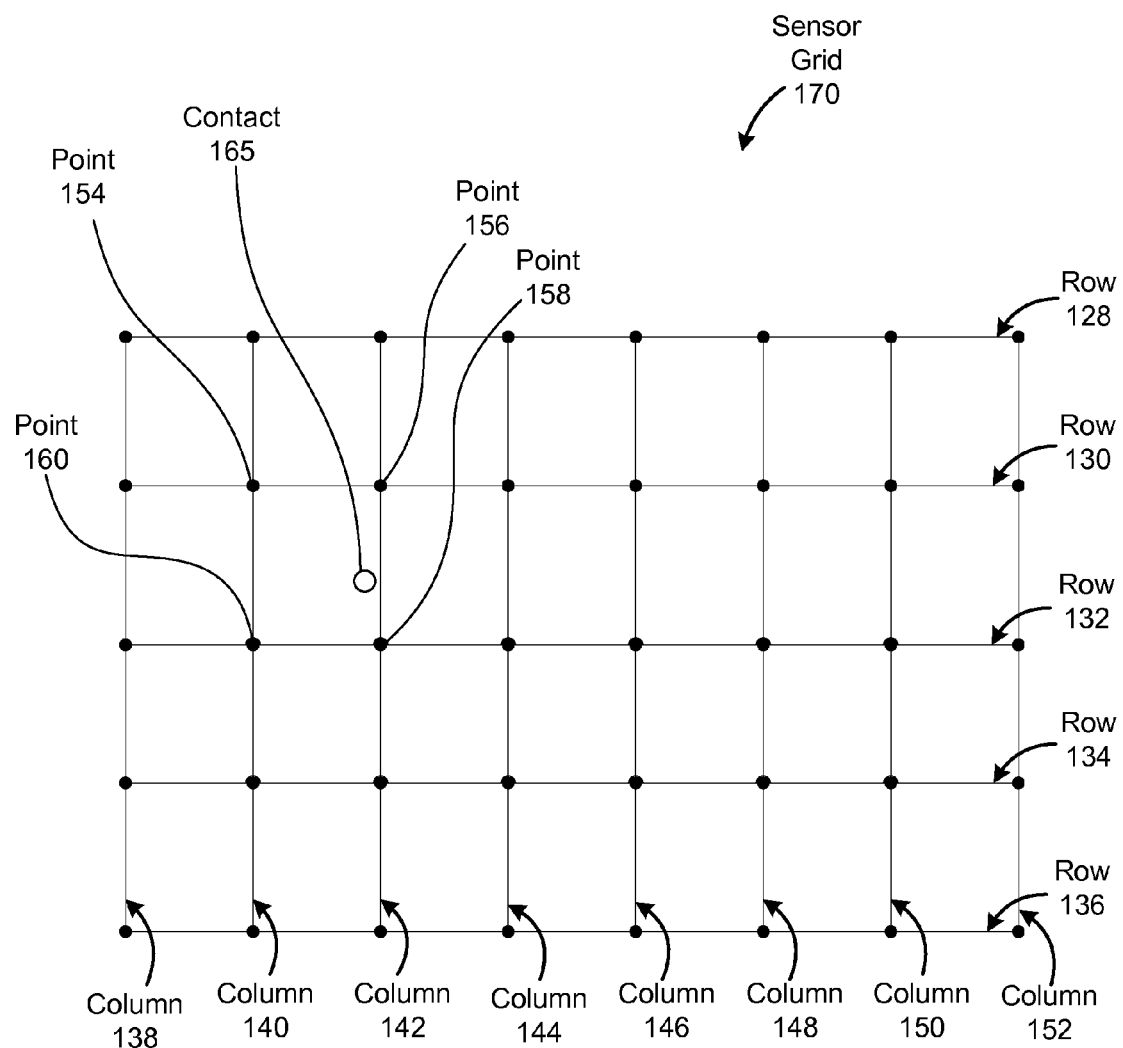
FIG. 1C is a diagram of a sensor grid, according to an example implementation.

FIG. 1C is a diagram of a sensor grid 170, according to an example implementation. The sensor grid 170 may be included as part of the tactile input device 110, such as part of sensor 116 shown in FIG. 1B. Other implementations are possible, and the specific depiction of sensor grid 170 shown in FIG. 1C is merely for illustration. For example, the sensor grid 170 may have any number of columns and rows, such as eight columns 138, 140, 142, 144, 146, 148, 150, 152 and five rows 128, 130, 132, 134, 136, and may be formed in another shape (e.g., circular). The sensor grid 170 may include any number sensors, such as sensor points 154, 156, 158, and 160. The sensor points may be spaced any distance (such as a few millimeters) apart from each other and may be designed to sense tactile input. The sensor grid 170 may read capacitance values and/or changes of capacitance values, which may indicate presence and/or pressure of a finger or stylus on the surface 114 of the tactile input device 110.

Input and/or contact 165, which may be a fingerpad, represents a position on sensor grid 170 when a user places a finger on the input device 110. As shown in FIG. 1C, contact 165 may be between columns 140, 142 and between rows 130, 132. In this example, the contact 165 may be about halfway between rows 130, 132, and one-fourth of a unit to the left of column 142 and/or three-fourths of a unit to the right of column 140. The sensor grid 170 may not accurately determine the location of the contact 165. For example, the sensor grid 170 may determine the contact 165 to be closer to either of the rows 130, 132 than the other, or may determine the contact 165 to be closer to column 142 than one-fourth of a unit to the column 142.

Figure 2A:
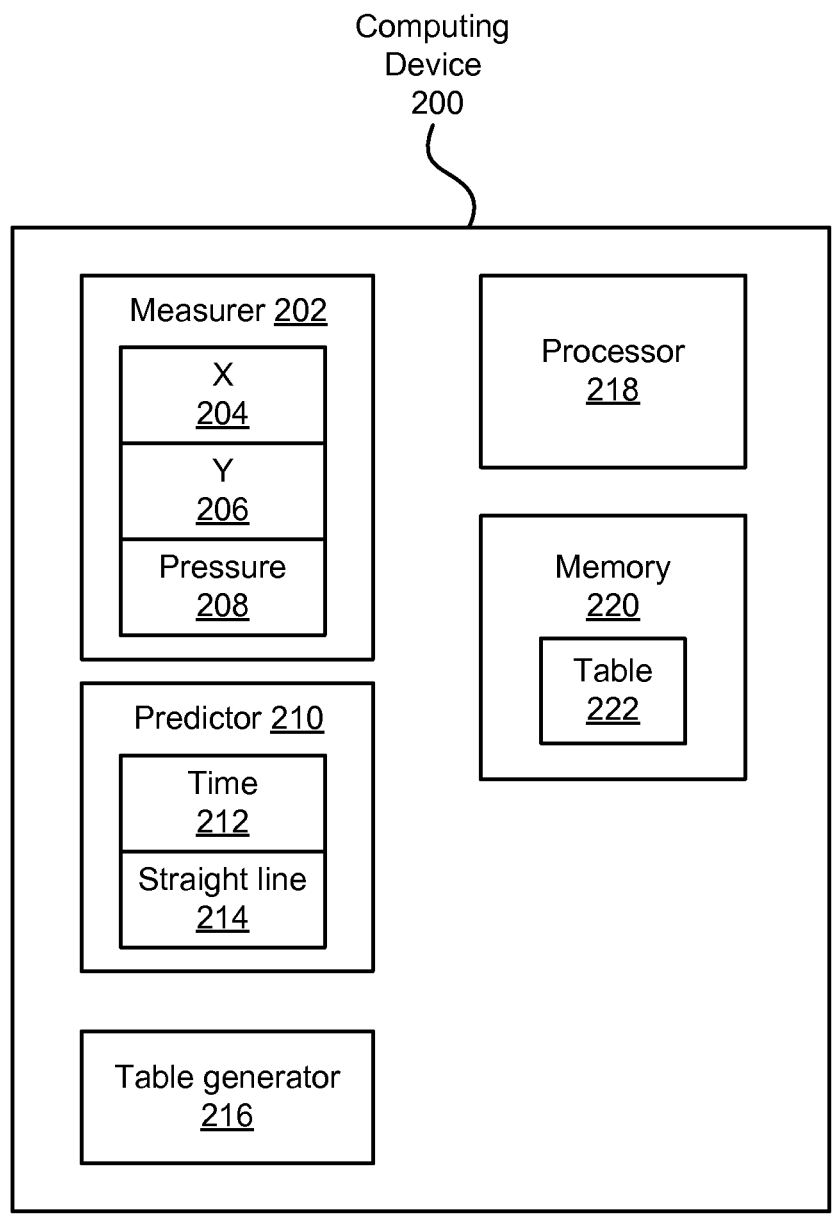
FIG. 2A is a diagram of a computing device according to an example implementation.

FIG. 2A is a diagram of a computing device 200 according to an example implementation. The computing device 200 may receive measurements of locations on the tactile input device 110, which may be inaccurate. The measurements may be based on inputs generated in a test environment. For example, a robotic arm may slide a stylus across the tactile input device 110 at many locations on the tactile input device 110 with varying amounts of pressure. The amount of pressure, which may reflect an amount and/or change of capacitance, may vary for different slides across the same locations of the tactile input device 110. The computing device 200 may receive the measurements of the stylus at different locations, which should cover the entire surface 114 of the tactile input device 110, with multiple pressure measurements for each location. The robotic arm may slide the stylus along the surface 114 of the tactile input device at a constant speed. Sliding the stylus at a constant speed may enable the computing device 200 to accurately predict the true location of the stylus on the tactile input device 110, which may be different than the measured location. The computing device 200 may determine true or predicted locations on the tactile input device corresponding to the received, inaccurate measurements. The computing device 200 may generate a table mapping the received, inaccurate measurements to the true or predicted locations.

The computing device 200 may include a measurer 202. The measurer 202 may receive measurements from the tactile input device 110. The measurer 202 may, for example, receive measured locations of the stylus on the tactile input device 110. The measurer 202 may receive the raw data from the sensor grid 170 which indicates the location of pressure of a finger or stylus. As used herein, the term, "pressure" may refer to actual pressure on the tactile input device 110, an area of contact and/or total surface area on the sensor grid or other measured portion of the tactile input device 110, a measured capacitance value, a change in measured capacitance value, or a measured inductance value or change of inductance value, as non-limiting examples. The pressure value may be passed between components of the tactile input device 110 shown in FIG. 1B, such as the microcontroller 118, the kernel driver 122, and/or the gesture library 124. The measurer may receive, for each measured contact, horizontal 'x' measurements, vertical 'y' measurements, and/or pressure measurements. While this description describes locations and measurements using Cartesian coordinates, other coordinate systems, such as polar coordinates, may also be used to describe locations and/or measurements.

The measurer 202 may include an X location measurer 204. The X location measurer 204 may measure or receive a horizontal measurement of the contact 165, which may be denoted as an 'x' value. The measurer 202 may also include a Y measurer 206. The Y measurer 206 may receive a vertical measurement of the contact 165, which may be denoted as a 'y' value. The measurer 202 may also include a pressure measurer 208. The pressure measurer 208 may receive a measured amount of pressure on the tactile input device 110. The pressure on the tactile input device 110 may reflect a capacitive value or resistance value, or change thereof, according to various implementations.

The computing device 200 may also include a predictor 210. The predictor 210 may predict the actual and/or true location of the stylus, finger or other source of pressure on the tactile input device 110 for each contact 165 measured by the measurer 204. The predictor 210 may predict where the measured contact actually was. The predictor 210 may predict where the location on the tactile input device 110 should be based, for example, on time, or based on assuming a straight line swipe across the tactile input device.

The predictor 210 may include a time predictor 212. The time predictor 212 may predict the location of the contact 165 based on an assumption that the stylus is moving along the tactile input device 110 at a constant rate of time. The time predictor 212 may, for example, determine the location by multiplying a rate or speed of movement of the stylus by the amount of time that the stylus has been moving, and adding that product to an initial value. The time predictor may thereby predict a true location, which may include both an 'x' value and a 'y' value in the example using Cartesian coordinates to describe location, of each contact received or measured by the measurer 202.

The predictor 210 may also include a straight line predictor 214. The straight line predictor 214 may predict the true location of the contact 165 on the assumption that the stylus is moving in a straight line across the tactile input device 110, causing the 'x' value and 'y' value to change in a fixed ratio with respect to each other. Inaccurate measurements may cause the line drawn by the stylus to appear curvy or wavy. The line predictor 214 may find a straight line through the inaccurate, curved or wavy line measurements, to find the true values of 'x' and 'y' for each contact. The straight line predictor 214 may determine the predicted values by associating measured values with a closest point on the straight line.

The predictor 210 may also measure the stylus's position on the surface 114 of the tactile input device 110 instead of mathematically predicting the stylus's location, according to an example implementation. The predictor 210 may, for example, use a position encoder(s) on a robotic arm, discussed below with respect to FIG. 3, to measure and/or determine what coordinates the stylus was at with respect to the surface 114 of the tactile input device 110. The predictor 210 could also receive data from a camera which takes pictures of the stylus on the surface 114 of the tactile input device 110, and correlate accurate physical positions of the stylus to positions measured by the sensor grid 170, according to an example implementation.

Figure 6:
FIG. 6 is a table showing measured values of 'x' and 'y', measured pressure values, and predicted values of 'x' and 'y'.

The computing device 200 may also include a table generator 216. The table generator 216 may generate a table mapping received or measured values to predicted values. The table generator 216 may, for example, generate a table with multiple rows. Each row may include a measured 'x' value, a measured 'y' value, and a measured pressure value received from the measurer 202, as well as a predicted 'x' value and a predicted 'y' value predicted by the predictor 210. The table generator 216 may store the table 222 in memory 220. An example of the table 222 is shown in FIG. 6.

The computing device 200 may also include a processor 218. The processor 218 may include a processor capable of performing functions and processes, such as the functions and processes described herein. The processor 218 may also be capable of executing instructions, such as instructions stored in memory.

The computing device 200 may also include a memory 220. The memory 220 may store instructions and data. The memory 200 may, for example, store instructions which, when executed by the processor 218, cause the computing device 200 to perform the functions and processes described herein. The memory 220 may also store the table 222 generated by the table generator 216.

Figure 2B:
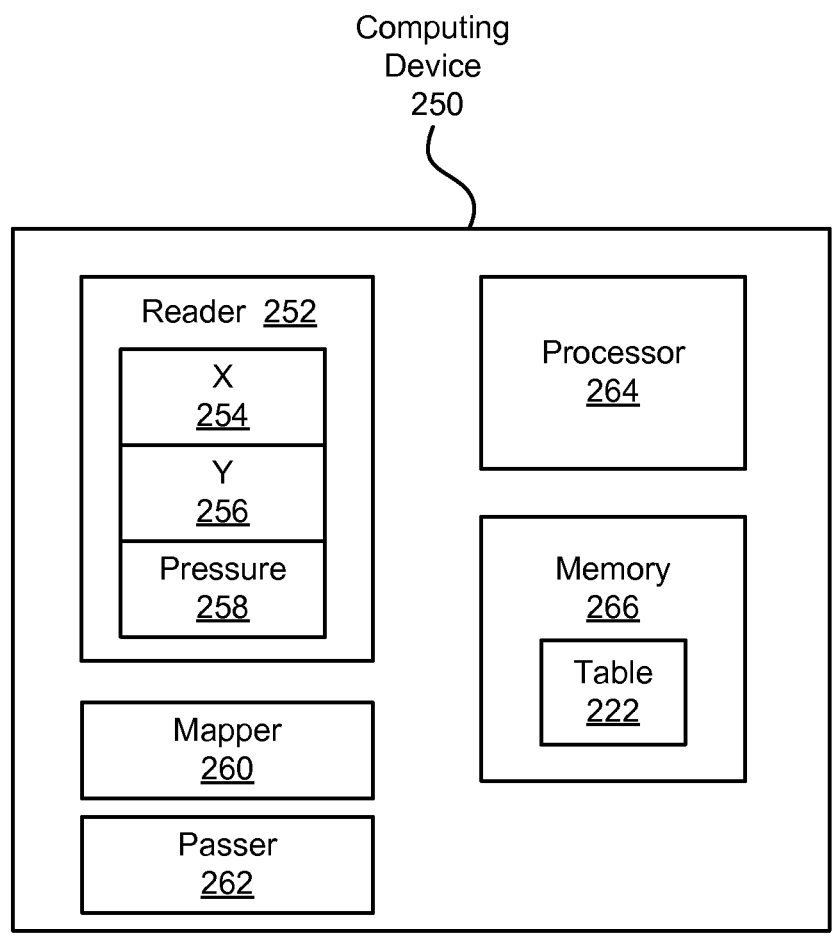
FIG. 2B is a diagram showing a computing device according to an example implementation.

FIG. 2B is a diagram showing a computing device 250 according to an example implementation. The computing device 250 may use the table 222 generated by the computing device 200 to predict accurate locations of contacts 165 on the tactile input device 110. The computing device 250 may receive inputs via the tactile input device 110, which may be in the form of raw data, map the inputs to predicted values in the table 222, and provide the predicted values to one or more applications. The computing device 250 may be the same computing device 200 shown in FIG. 2A, or may be a different computing device, according to example implementations.

The computing device 250 may include a reader 252. The reader 252 may read measurements from the tactile input device 110. The reader 252 may read 'x' measurements which reflect horizontal values, 'y' measurements which reflect vertical values, and/or pressure measurements which may reflect capacitance or resistance values. The reader 252 may include an 'x' reader 254. The 'x' reader 254 may read 'x' measurements or horizontal measurements from the tactile input device 110. The reader 252 may also include a 'y' reader 256. The 'y' reader 256 may read 'y' measurements or vertical measurements from the tactile input device 110. The reader 252 may also include a pressure reader 258. The pressure reader 258 may read pressure measurements from the tactile input device 110. The measured 'x', 'y', and/or pressure values may be mapped to predicted location values, such as 'x' and 'y' values.

The computing device 250 may include a mapper 260. The mapper 260 may map the received measurements, such as the 'x' value, the 'y' value and/or the pressure value received from the reader 252, to stored 'x' values, 'y' values, and/or pressure values stored in the table 222. The mapper 260 may map the received values to the stored values to find predicted values. The mapper 260 may, for example, find a set of 'x', 'y', and pressure values stored in the table 222 that most closely match the received values. The matching 'x', 'y', and pressure values may be included in a row of the table 222 that also includes predicted 'x' and 'y' values. The mapper may map the received 'x', 'y', and pressure values to the predicted 'x' and 'y' values in the row that includes stored 'x', 'y', and pressure values that most closely match the received 'x', 'y', and pressure values.

The computing device 250 may also include a passer 262. The passer 262 may pass the predicted, accurate locations, which may include 'x' and 'y' values, which were mapped by the mapper 260, to one or more applications 126.

The computing device 250 may also include a processor 264. The processor 264 may be configured to perform functions and processes, such as the functions and processes described herein. The processor 264 may also be capable of executing instructions, such as instructions stored by a memory 266.

The computing device 250 may also include the memory 266. The memory 266 may store instructions and data. The memory 266 may, for example, store instructions that, when executed by the processor 264, cause the computing device 250 to perform the functions and processes described herein. The memory 266 may also store the table 222 generated by the table generator 216 of the computing device 200, which the mapper 260 uses to map the values received from the reader 252 to accurate values.

Figure 3:
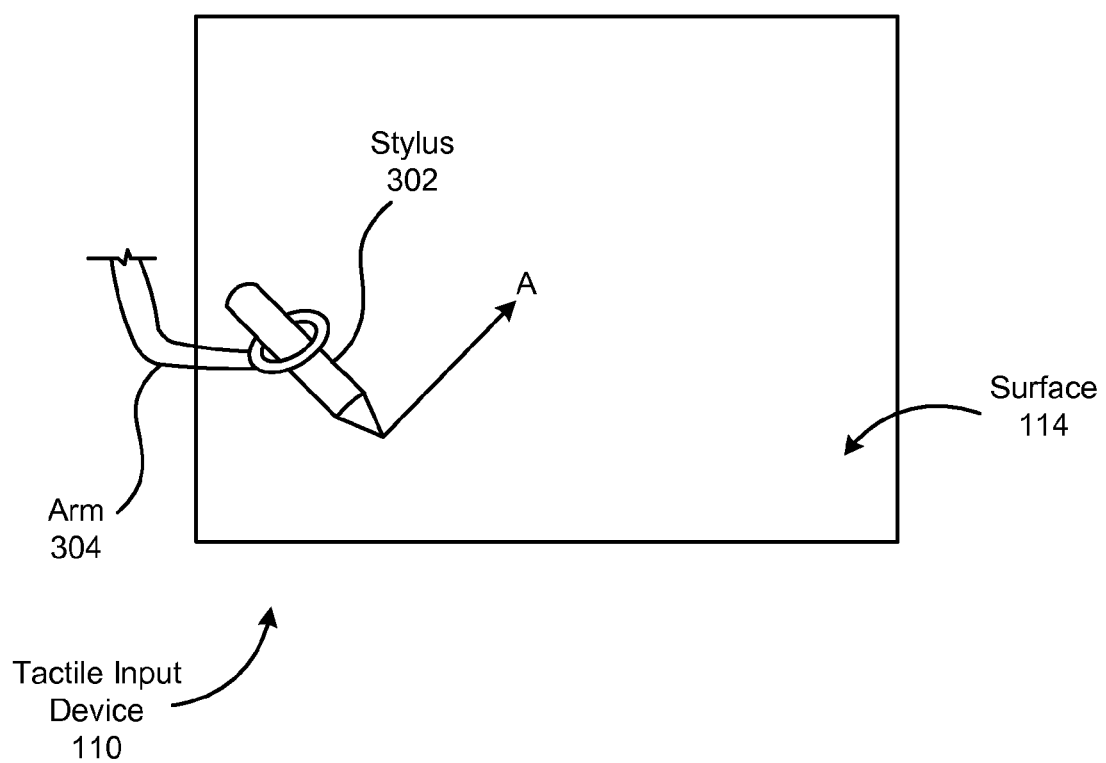
FIG. 3 is a diagram showing a stylus being swiped across a surface of the tactile input device.

FIG. 3 is a diagram showing a stylus 302 being swiped across the surface 114 of the tactile input device 110. The stylus 302 may be swiped across the surface 114 of the tactile input device 110 to generate the input values, such as location including 'x' and 'y' values and/or pressure, received by the measurer 202. In an example implementation, a robotic arm 304 may move and/or control the stylus 302 to move the stylus in a predictable manner across the surface 114 of the tactile input device 110, thereby minimizing error in swiping the stylus 302 across the surface 114. The stylus 302 may be swiped across the surface 114 in straight lines at a constant rate. The straight lines and constant rate may allow the predictor 210 of the computing device 200 to accurately predict the locations of the stylus 302 across the tactile input device 110.

Swiping the stylus in straight lines across the surface 114 may allow the straight line predictor 214 to predict contact locations based on 'x' and 'y' values changing in a fixed ratio to each other. Swiping the stylus across the surface 114 at a constant rate may allow the time predictor 212 to predict the contact locations as a function of time.

The arm 304 may swipe the stylus 302 across the tactile input device 110 at forty-five degree angles, as shown by the arrow denoted 'A'. The forty-five degree angles may allow the stylus 302 to contact both different 'x' values and different 'y' values, thereby covering more points of contact within a given period of time. The forty-five degree angle may also have the benefit of having equal changes to 'x' and 'y' during each swipe, enabling the location to be predicted based on straight lines. However, the arm 304 may also swipe the stylus 302 across the surface 114 of the tactile input device 110 at angles other than forty-five degrees.

Figure 4:
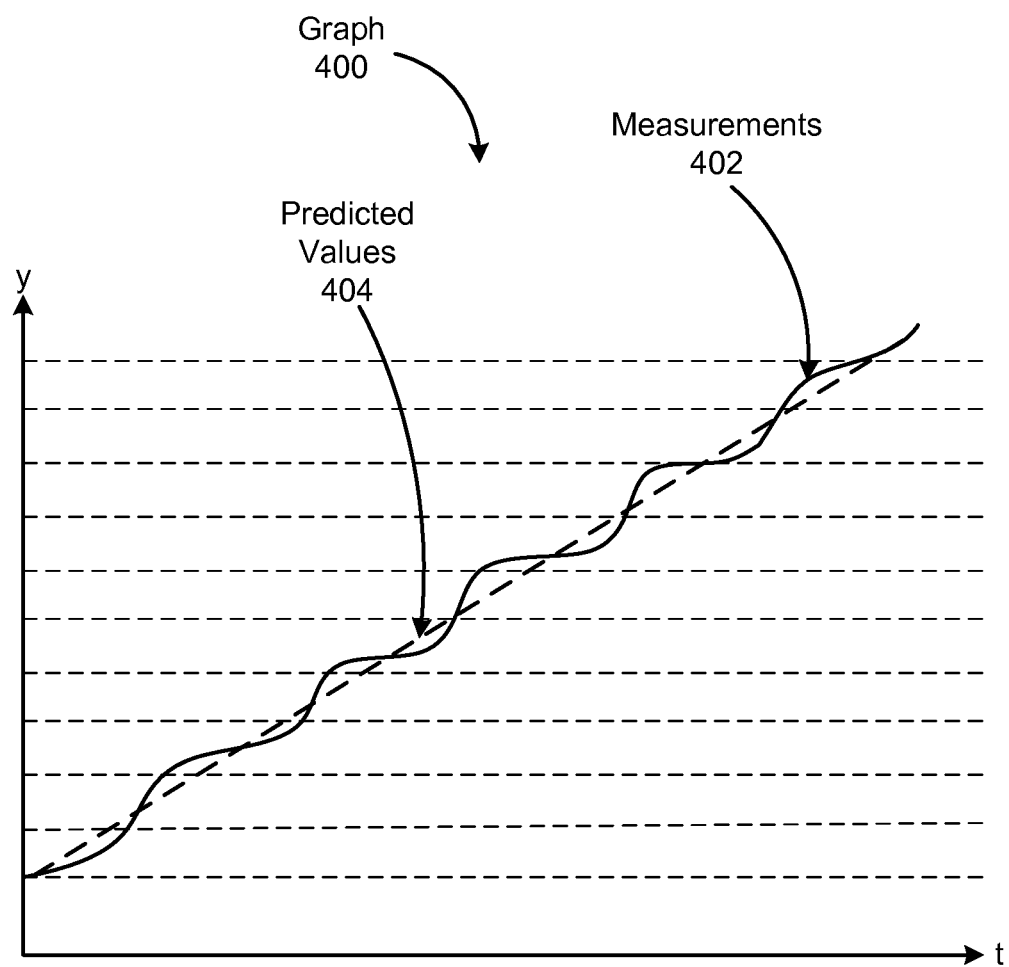
FIG. 4 is a graph showing measured 'y' values versus time.

FIG. 4 is a graph showing measured 'y' values versus time. The dashed horizontal lines in FIG. 4 represent rows of wires, such as the rows 128, 130, 132, 134, 136 shown in FIG. 1C. In this example, the stylus 302 shown in FIG. 3 may have slid along the surface 114 of the tactile input device 110. Due to the constant speed at which the stylus 302 slid across the surface 114, the true or accurate values of 'y' should form a straight line as a function of time. The straight, dashed, diagonal line shows the predicted values 404 that the straight line predictor 404 may predict based on the constant speed of the stylus 302 sliding across the surface 114.

As shown in FIG. 4, the measured values 402 of 'y' may not form a straight line as a function of time. At times, the 'y' values remain closer to the grid lines than the actual location of the point of contact. The curves or waves, and/or the difference between the measured values 402 and the predicted values 404, may represent the error in determining the actual location at which the stylus 302 contacts the surface 114. The table generator 216 may, for each sampled value of time or 't', populate rows of the table 222 with the measured values 402 and the predicted values 404. The rows may be populated with measured and predicted values for both 'x' and 'y', as well as pressure values. The pressure values may be measured values, and may have been measured by the pressure measurer 208.

Figure 5:
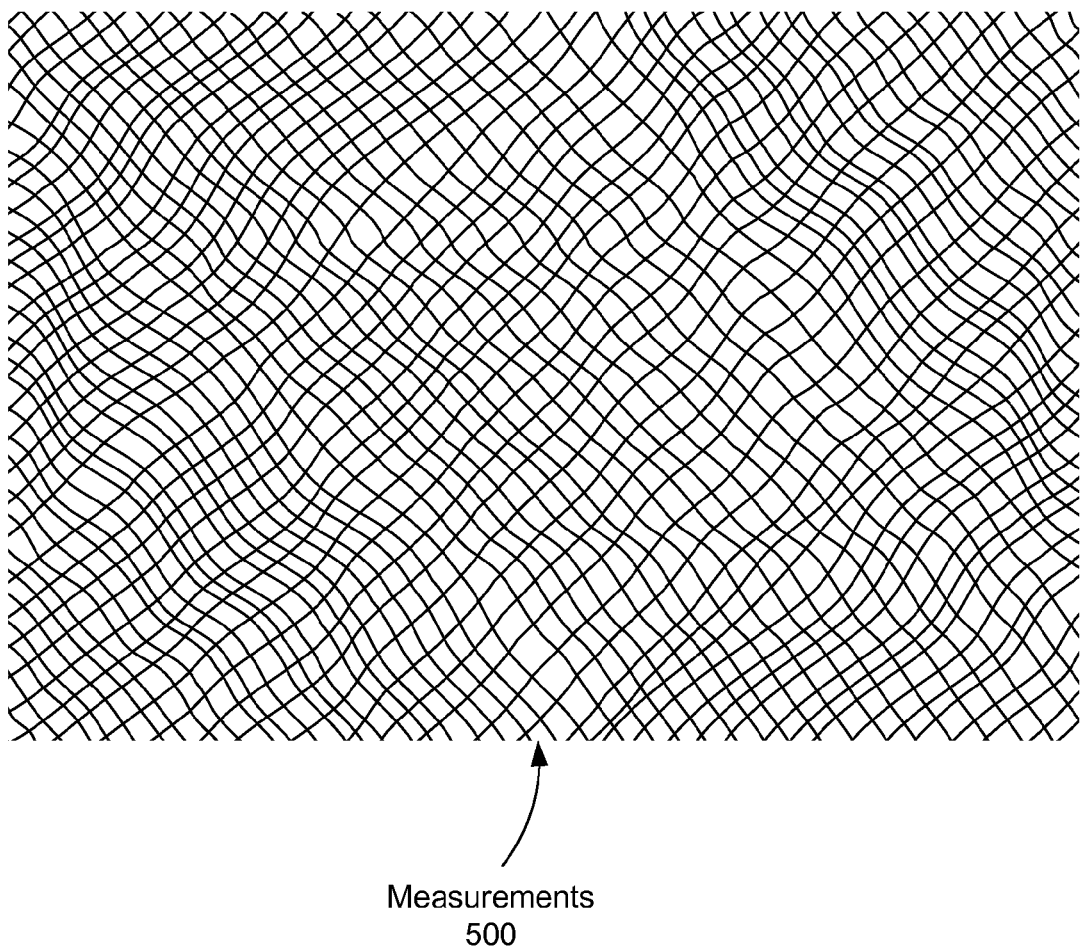
FIG. 5 is a diagram showing measured locations in both the 'x' axis and the 'y' axis.

FIG. 5 is a diagram showing measured locations in both the 'x' axis and the 'y' axis. In this example, the stylus 302 slid across the surface 114 in straight, forty-five degree angle lines. However, as shown in FIG. 5, the measured locations of the points of contact do not form straight lines. The measured lines are curvy and/or wavy based on errors in the measured values of 'x' and 'y'. In an example in which the straight line predictor 214 predicts locations based on the assumption that the stylus 302 moves across the surface 114 in a straight line, the straight line predictor 214 may generate a line of best fit for each of the curvy or wavy lines. The table generator 216 may populate the table 222 with measured values for 'x' and 'y' based on the shown measured locations and predicted or accurate values based on the generated lines, for a given pressure value.

FIG. 6 is a table 222 showing measured values of 'x' and 'y', measured pressure values, and predicted values of 'x' and 'y'. As shown in FIG. 6, the measured values may be different from the predicted values. In a given row of the table 222, the measured values of 'x' and 'y' and the measured pressure values may be the values measured by the 'x' measurer 204, the 'y' measurer 206, and the pressure measurer 208, and the predicted 'x' values and 'y' values may be predicted by the time predictor 212 and/or the straight line predictor 214. When mapping measured values to predicted values, the mapper 260 may map measured 'x' values, 'y' values, and pressure values to predicted 'x' values and 'y' values by finding measured 'x' values, 'y' values, and pressure values in the table 222 that are closest to the received values, retrieving the predicted values of 'x' and 'y' that are in the same row as the measured 'x' values, 'y' values, and pressure values in the table 222 that are closest to the received values. The mapper 260 may determine closest values based on a smallest total difference, smallest difference of the greater of the two differences, a least squares fit, as non-limiting examples. The passer 262 may pass the predicted values of 'x' and 'y' from the row of closest fit to an application(s) 126.

Figure 7:
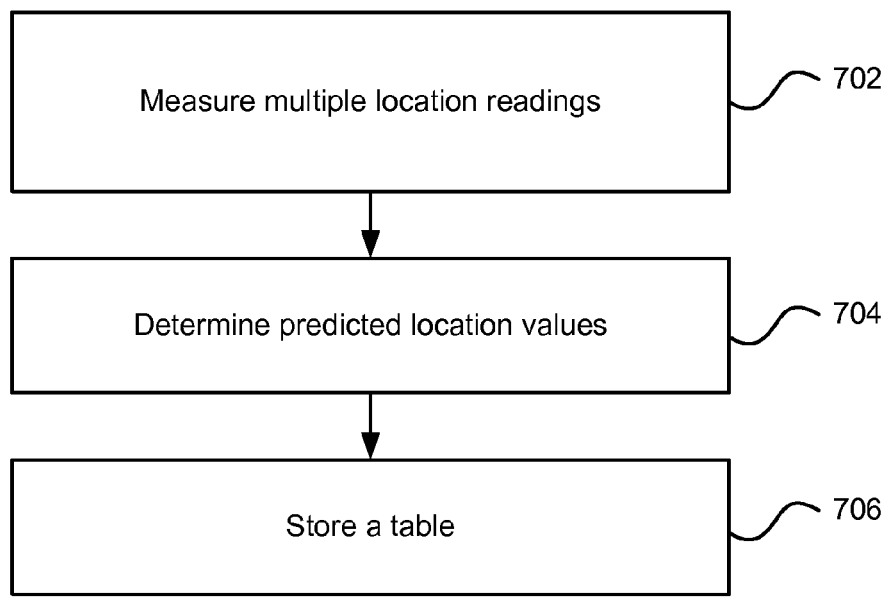
FIG. 7 is a flowchart showing a method according to an example implementation.

FIG. 7 is a flowchart of a method according to an example implementation. In this example, the method may include measuring multiple location readings across a tactile input device at multiple times (702). The method may also include determining predicted location values corresponding to multiple locations across the tactile input device at the multiple measured times (704). The method may also include storing a table mapping the multiple location readings to the predicted location values (706).

According to an example implementation, the determining the predicted location values may include determining the predicted location values based on an assumption that the predicted location readings form a straight line.

According to an example implementation, the measuring multiple location readings may include measuring multiple 'x' values and multiple 'y' values across the tactile input device at multiple times, the determining predicted location values may include determining predicted 'x' values and multiple predicted 'y' values corresponding to locations across the tactile input device at the multiple measured times, and the storing may include storing the table mapping the multiple measured 'x' values and the multiple measured 'y' values to the predicted 'x' values and the predicted 'y' values.

According to an example implementation, the determining predicted location values may include determining the predicted location values based on an assumption that the predicted 'x' values should change as a constant function of the predicted 'y' values.

According to an example implementation, the measuring multiple location readings may include measuring multiple 'x' values, measuring multiple 'y' values, and measuring multiple pressure values across the tactile input device at multiple times, the determining predicted location values may include determining multiple predicted 'x' values and multiple predicted 'y' values corresponding to locations across the tactile input device at the multiple measured times, and the storing may include storing the table mapping the multiple measured 'x' values, the multiple measured 'y' values, and the multiple measured pressure values to the predicted 'x' values and the predicted 'y' values.

According to an example implementation, the measuring multiple location readings may include measuring multiple 'x' values, measuring multiple 'y' values, and measuring multiple capacitance values across the tactile input device at multiple times, the determining predicted location values may include determining multiple predicted 'x' values and multiple predicted 'y' values corresponding to locations across the tactile input device at the multiple measured times, and the storing may include storing the table mapping the multiple measured 'x' values, the multiple measured 'y' values, and the multiple measured capacitance values to the predicted 'x' values and the predicted 'y' values.

According to an example implementation, the tactile input device may include a grid with horizontal wires and vertical wires, the horizontal wires being approximately orthogonal to the vertical wires, and the predicted location values may change in a horizontal direction at approximately a same rate as the predicted location values change in a vertical direction.

According to an example implementation, the determining predicted location values may include determining the predicted location values based on a function that relates the predicted location values to time.

According to an example implementation, the determining predicted location values may include determining the predicted location values based on an assumption that the predicted location values change as a constant function of time.

According to an example implementation, the method may further include sliding a stylus across the tactile input device. The measuring may include measuring multiple location readings of the stylus across the tactile input device at multiple times.

According to an example implementation, the sliding the stylus may include sliding the stylus, by an electronic device, across the tactile input device.

Figure 8:
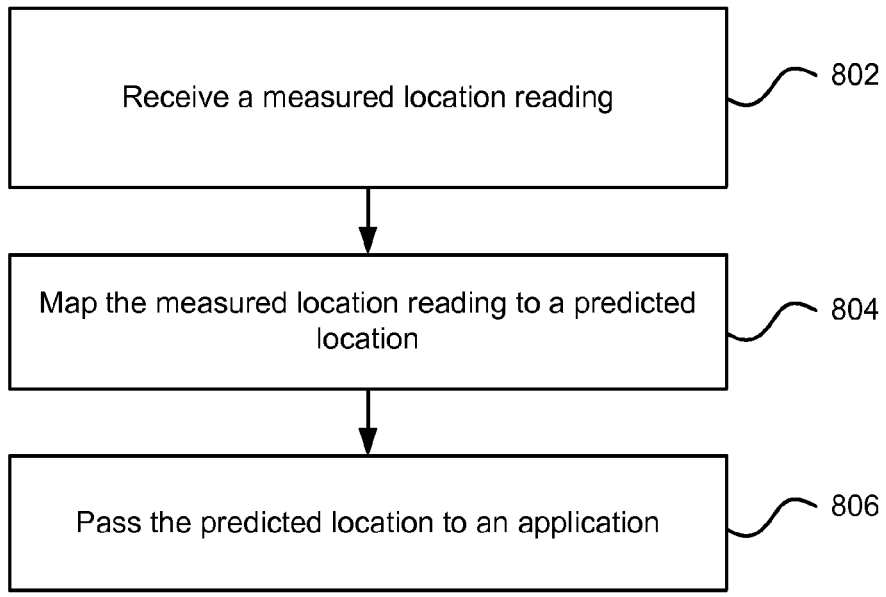
FIG. 8 is a flowchart showing a method according to another example implementation.

FIG. 8 is a flowchart of a method according to another example implementation. The method may include receiving at least one measured location reading, the at least one measured location reading indicating at least one location on a tactile input device (802). The method may also include mapping the at least one measured location reading to at least one predicted location (804). The method may also include passing the at least one predicted location to an application (806).

According to an example implementation, the receiving the at least one measured location reading may include receiving at least one measured 'x' value and at least one measured 'y' value, the at least one measured 'x' value and the at least one measured 'y' value indicating the at least one location on the tactile input device, the mapping the at least one measured location reading may include mapping the at least one measured 'x' value and the at least one measured 'y' value to at least one predicted 'x' value and at least one predicted 'y' value, and the passing the at least one predicted location may include passing the at least one predicted 'x' value and the at least one predicted 'y' value to the application.

According to an example implementation, the receiving the at least one measured location reading may include receiving the at least one measured location reading and a measured pressure value, and the mapping may include mapping the at least one measured location reading and the measured pressure value to the at least one predicted location.

According to an example implementation, the receiving the at least one measured location reading may include receiving the at least one measured location reading and a measured capacitance value, and the mapping may include mapping the at least one measured location reading and the measured capacitance value to the at least one predicted location.

According to an example implementation, the mapping may include checking a table, the table including multiple stored measured location readings and multiple stored predicted location readings.

According to an example implementation, the mapping may include checking a table, the table including multiple stored measured location readings and multiple stored predicted location readings, determining which of the multiple stored measured location readings in the table is closest to the at least one measured location reading, and selecting, as the at least one predicted location, at least one stored predicted location that is associated with at least one stored measured location that is closest to the at least one measured location.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   measuring multiple location readings on a tactile input device, the measured multiple location readings covering an entire surface of the tactile input device and each including a single measured 'x' value and a single measured 'y' value;
   determining a single true 'x' value and a single true 'y' value corresponding to each of the measured multiple location readings on the tactile input device; and
   storing a table mapping each of the measured multiple location readings, each measured location reading including the single measured 'x' value and the single measured 'y' value, to the corresponding single true 'x' value and the single true 'y' value.

2. The method of claim 1, wherein the determining the true 'x' values and 'y' values includes determining true location values based on an assumption that true locations reflected by the true 'x' values and true 'y' values form a straight line.

3. The method of claim 1, wherein the determining true 'x' values and true 'y' values includes determining the true 'x' values and true 'y' values based on an assumption that the true 'x' values should change as a constant function of the true 'y' values.

4. The method of claim 1, wherein:
the measuring multiple location readings includes measuring multiple 'x' values, measuring multiple 'y' values, and measuring multiple pressure values on the tactile input device; and
the storing includes storing the table mapping each of the measured location readings, each measured location reading including a single measured 'x' value, a single measured 'y' value, and a single measured pressure value, to the corresponding single true 'x' value and the single true 'y' value.

5. The method of claim 1, wherein:
the measuring multiple location readings includes measuring multiple 'x' values, measuring multiple 'y' values, and measuring multiple capacitance values on the tactile input device; and
the storing includes storing the table mapping each of the measured multiple location readings, each measured location reading including a single measured 'x' value, a single measured 'y' value, and a single measured capacitance value corresponding to the single true 'x' value and the single true 'y' value.

6. The method of claim 1, wherein:
the tactile input device comprises a grid with horizontal wires and vertical wires, the horizontal wires being approximately orthogonal to the vertical wires; and
the true 'x' values change in a horizontal direction at approximately a same rate as the true 'y' values change in a vertical direction.

7. The method of claim 1, wherein the determining true 'x' values and the true 'y' values includes determining the true 'x' values and the true 'y' values based on a function that relates the true 'x' values and the true 'y' values to time.

8. The method of claim 1, wherein the determining true 'x' values and the true 'y' values includes determining the true 'x' values and the true 'y' values based on an assumption that the true 'x' values and the true 'y' values change as a constant function of time.

9. The method of claim 1, further comprising:
sliding a stylus across the tactile input device,
wherein the measuring comprises measuring multiple location readings of the stylus across the tactile input device at multiple times.

10. The method of claim 9, wherein the sliding the stylus comprises sliding the stylus, by an electronic device, across the tactile input device.

11. A non-transitory computer-readable storage medium comprising instructions stored thereon that, when executed by at least one processor, are configured to cause a computing system to at least:
receive a single measured location reading, the single measured location reading indicating a single measured 'x' value and a single measured 'y' value, on a tactile input device;
map the at least one measured location reading to a single true location, the single true location including a single true 'x' value and a single true 'y' value and having been determined before receiving the single measured location reading; and
pass the at least one true location to an application.

12. The non-transitory computer-readable storage medium of claim 11, wherein:
the instructions are further configured to cause the computing system to receive a single measured pressure value; and
the mapping comprises mapping the single measured location reading and the single measured pressure value to the single true location.

13. The non-transitory computer-readable storage medium of claim 11, wherein:
the instructions are further configured to cause the computing system to receive a single measured capacitance value; and
the mapping comprises mapping the single measured location reading and the single measured capacitance value to the single true location.

14. The non-transitory computer-readable storage medium of claim 11, wherein the mapping comprises checking a table, the table including multiple stored measured location readings, each of the multiple measured location readings including a single stored measured 'x' value and a single stored measured 'y' value, and multiple stored true location readings, each of the multiple stored true location readings corresponding to one of the multiple measured location readings and including a single stored true 'x' value and a single stored true 'y' value, the table having been stored before receiving the single measured location reading.

15. The non-transitory computer-readable storage medium of claim 11, wherein the mapping comprises:
checking a table, the table including multiple stored measured location readings, each of the multiple stored measured location readings including a single stored measured 'x' value and a single stored measured 'y' value, and multiple stored true location readings, each of the multiple stored true location readings corresponding to one of the multiple measured location readings and including a single stored true 'x' value and a single stored true 'y' value, the table having been stored before receiving the single measured location reading;
determining which of the multiple stored measured location readings in the table is closest to the single measured location reading; and
selecting, as the single true location, one stored true location that is associated with one stored measured location that is closest to the single measured location.

16. A non-transitory computer-readable storage medium comprising instructions stored thereon that, when executed by at least one processor, are configured to cause a computing device to at least:
measure multiple location readings on a tactile input device at multiple times, each of the measured multiple location readings including a single measured 'x' value and a single measured 'y' value;
determine a single true location value corresponding to each of the measured multiple location readings on the tactile input device, each of the true location values including a single true 'x' value and a single true 'y' value; and
store a table mapping the measured multiple location readings to the true location values.

17. The non-transitory computer-readable storage medium of claim 16, wherein:
the measuring multiple location readings includes measuring multiple 'x' values, measuring multiple 'y' values, and measuring multiple pressure values on the tactile input device at multiple times;
the determining the single true location value includes determining the single true 'x' value and the single true 'y' value corresponding to each of the measured multiple location readings on the tactile input device at the multiple measured times; and the storing includes storing the table mapping a single measured 'x' value, a single measured 'y' value, and a single measured pressure value to each of the true 'x' values and the true 'y' values.

* * * * *